US012784165B2

(12) United States Patent
Xu et al.

(10) Patent No.: US 12,784,165 B2
(45) Date of Patent: Nov. 3, 2026

(54) METHOD AND APPARATUS FOR DETERMINING WHETHER CONTAINER OF PLANT IS SUITABLE FOR PLANT MAINTENANCE

(71) Applicant: Hangzhou Ruisheng Software Co., Ltd., Zhejiang (CN)

(72) Inventors: Qingsong Xu, Zhejiang (CN); Qing Li, Zhejiang (CN)

(73) Assignee: Hangzhou Ruisheng Software Co., Ltd., Zhejiang (CN)

( * ) Notice: Subject to any disclaimer, the term of this patent is extended or adjusted under 35 U.S.C. 154(b) by 236 days.

(21) Appl. No.: 18/729,892

(22) PCT Filed: Dec. 23, 2022

(86) PCT No.: PCT/CN2022/141275
§ 371 (c)(1),
(2) Date: Jul. 18, 2024

(87) PCT Pub. No.: WO2023/138298
PCT Pub. Date: Jul. 27, 2023

(65) Prior Publication Data

US 2025/0111491 A1 Apr. 3, 2025

(30) Foreign Application Priority Data

Jan. 24, 2022 (CN) ......................... 202210079454.7

(51) Int. Cl.
*G06T 7/00* (2017.01)
*G06T 7/13* (2017.01)
(Continued)

(52) U.S. Cl.
CPC .............. *G06T 7/0002* (2013.01); *G06T 7/13* (2017.01); *G06T 7/50* (2017.01); *G06T 7/62* (2017.01);
(Continued)

(58) Field of Classification Search
CPC ........... G06T 7/0002; G06T 7/13; G06T 7/50; G06T 7/62; G06T 2207/20081;
(Continued)

(56) References Cited

U.S. PATENT DOCUMENTS

2011/0116688 A1 5/2011 Li et al.

FOREIGN PATENT DOCUMENTS

CN 101480151 7/2009
CN 102498909 6/2012
(Continued)

OTHER PUBLICATIONS

"Office Action of China Counterpart Application", issued on Dec. 10, 2024, p. 1-p. 12.

(Continued)

*Primary Examiner* — Wassim Mahrouka
(74) *Attorney, Agent, or Firm* — JCIPRNET

(57) ABSTRACT

The present disclosure relates to a method and an apparatus for determining whether a container of a plant is suitable for plant maintenance. Disclosed is the method for determining whether the container of the plant is suitable for plant maintenance, including: identifying a shape of the container and calculating actual size information of the container based on an image including the container acquired by a camera and associated camera information; identifying a species of the plant based on an image including the plant; and determining whether the actual size information of the container is within a container size range suitable for the identified species based on the identified species, the identified shape of the container, and the calculated actual size information of the container, so as to determine whether the container is suitable for plant maintenance.

17 Claims, 2 Drawing Sheets

(51) Int. Cl.
*G06T 7/50* (2017.01)
*G06T 7/62* (2017.01)
*G06V 10/774* (2022.01)
*G06V 20/10* (2022.01)

(52) U.S. Cl.
CPC .......... *G06V 10/774* (2022.01); *G06V 20/188* (2022.01); *G06T 2207/20081* (2013.01); *G06T 2207/30188* (2013.01)

(58) Field of Classification Search
CPC ............. G06T 2207/30188; G06T 7/60; G06T 2207/20084; G06V 10/774; G06V 20/188; G06V 10/764; G06V 10/82; G06N 3/045; G06N 3/08
See application file for complete search history.

(56) References Cited

FOREIGN PATENT DOCUMENTS

| | | | | | |
|---|---|---|---|---|---|
| CN | 106163262 | | | 11/2016 | |
| CN | 106818282 | | | 6/2017 | |
| CN | 106872643 | | | 6/2017 | |
| CN | 109658501 | | | 4/2019 | |
| CN | 109658501 | A | * | 4/2019 | ............. G06T 17/00 |
| CN | 110122284 | | | 8/2019 | |
| CN | 113158750 | | | 7/2021 | |
| CN | 113298180 | | | 8/2021 | |
| CN | 113298180 | A | * | 8/2021 | ............. G06F 18/24 |
| CN | 113781481 | | | 12/2021 | |
| CN | 113781481 | A | * | 12/2021 | ........... H04N 23/695 |
| CN | 114419133 | | | 4/2022 | |
| KR | 102339374 | | | 12/2021 | |
| KR | 102339374 | B1 | * | 12/2021 | ............. G06T 19/00 |

OTHER PUBLICATIONS

"Office Action of China Counterpart Application", issued on Feb. 12, 2025, p. 1-p. 9.

"International Search Report (Form PCT/ISA/210) of PCT/CN2022/141275," mailed on Mar. 16, 2023, with English translation thereof, pp. 1-6.

"Written Opinion of the International Searching Authority (Form PCT/ISA/237) of PCT/CN2022/141275," mailed on Mar. 16, 2023, pp. 1-4.

* cited by examiner

METHOD AND APPARATUS FOR DETERMINING WHETHER CONTAINER OF PLANT IS SUITABLE FOR PLANT MAINTENANCE

CROSS-REFERENCE TO RELATED APPLICATION

This application is a 371 of international application of PCT application serial no. PCT/CN2022/141275, filed on Dec. 23, 2022, which claims the priority benefit of China application no. 202210079454.7, filed on Jan. 24, 2022. The entirety of each of the above mentioned patent applications is hereby incorporated by reference herein and made a part of this specification.

TECHNICAL FIELD

The present disclosure relates to the field of computer technology, and particularly relates to a method and an apparatus for determining whether a container of a plant is suitable for plant maintenance.

RELATED ART

In the process of plant maintenance, containers such as flower pots and vases are generally used to place and/or plant plants. Containers for plants on the market have various, for example, sizes, shapes, and materials, and it is difficult for ordinary users to determine whether the container currently used is suitable for the plants planned to be planted or placed in the container or the plants currently planted or placed in the container. An inappropriate container of a plant may restrict the growth and development of plants and have adverse effects on the plants.

SUMMARY OF INVENTION

The purpose of the present disclosure includes providing a method and an apparatus for determining whether a container of a plant is suitable for plant maintenance, so as to facilitate finding a flower pot suitable for the current plant species for plant maintenance.

According to the first aspect of the present disclosure, the method for determining whether the container of the plant is suitable for plant maintenance is provided, including: identifying a shape of the container and calculating actual size information of the container based on an image including the container acquired by a camera and associated camera information; identifying a species of the plant based on an image including the plant; determining whether the actual size information of the container is within a container size range suitable for the species identified based on the species identified, the shape identified of the container, and the actual size information calculated of the container, so as to determine whether the container is suitable for plant maintenance.

According to the second aspect of the present disclosure, the apparatus for determining whether the container of the plant is suitable for plant maintenance is provided, and the apparatus includes: one or more processors; and a memory storing computer-readable commands, in which when the computer-readable commands are executed by the one or more processors, the one or more processors are caused to execute the method according to the first aspect of the present disclosure.

According to the third aspect of the present disclosure, a non-transitory computer-readable storage medium is provided, in which the non-transitory computer-readable storage medium stores computer-readable commands, when the computer readable commands are executed by one or more computing apparatus, the one or more computing apparatus are caused to execute the method according to the first aspect of the present disclosure.

Other features and advantages of the present disclosure will become clear from the following detailed description of exemplary embodiments of the present disclosure with reference to the accompanying drawings.

BRIEF DESCRIPTION OF DRAWINGS

The accompanying drawings, which constitute a part of the specification, illustrate embodiments of the present disclosure and, together with the specification, serve to explain the principles of the present disclosure.

The present disclosure may be more clearly understood from the following detailed description with reference to the accompanying drawings, in which.

Figure 1:
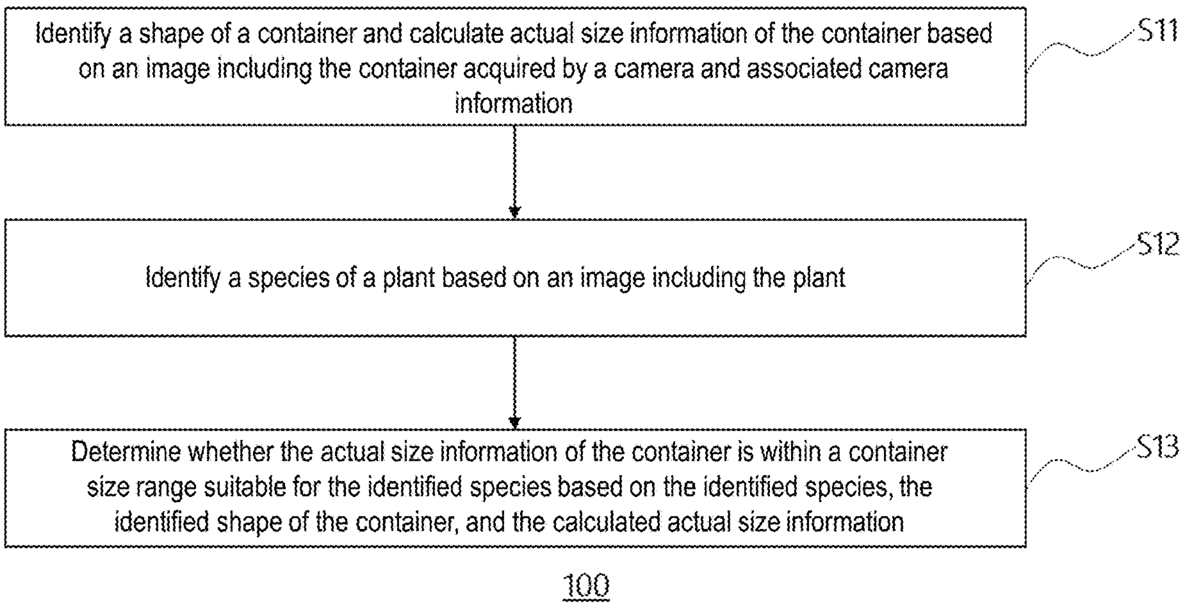
FIG. 1 is a flow chart schematically illustrating at least a portion of a method for determining whether a container of a plant is suitable for plant maintenance according to an embodiment of the present disclosure.

It should be note that in the embodiments described below, the same reference numerals may be used in common among different drawings to indicate the same parts or parts having the same functions, and repeated descriptions thereof are omitted. In this specification, similar reference numerals and letters are used to denote similar items, and thus, once an item is defined in a drawing, then it is not needed to be discussed further in subsequent drawings.

DESCRIPTION OF EMBODIMENTS

Various exemplary embodiments of the present disclosure will be described in detail below with reference to the accompanying drawings. It should be noted that the relative arrangement of components and steps, the numerical expressions and numerical values set forth in the embodiments do not limit the scope of the present disclosure unless specifically stated otherwise. In the following description, many details are set forth in order to better explain the present disclosure. However, it should be understood that the present disclosure can be practiced without the details.

The following description of at least one exemplary embodiment is merely illustrative in nature and is in no way intended to limit the present disclosure and the application or the use thereof. In all examples shown and discussed herein, any specific values should be interpreted as merely exemplary and not as limiting.

Technologies, methods, and equipment known to ordinary technicians in the related art may not be discussed in detail, but where appropriate, such technologies, methods, and equipment should be considered part of the specification.

FIG. 1 schematically illustrates a flow chart of at least a portion of a method 100 for determining whether a container of a plant is suitable for plant maintenance according to an embodiment of the present disclosure. The plant described herein may refer to a whole plant of a plant, and the whole plant may be planted in a container (such as a flower pot); a plant may also refer to at least a portion of a plant, such as a flower and/or a leaf of a plant, and the portions of the plant may be placed in a container (such as a vase).

As shown in FIG. 1, in S11, a shape of the container may be identified and actual size information of the container may be calculated based on an image including the container acquired by a camera and associated camera information.

Here, the camera may be, for example, a camera included in a mobile device such as a smartphone or a tablet computer, or may be a digital camera; also, the camera may have a single optical lens, or may include a lens group comprising a plurality of optical lenses, such as a binocular camera.

The image acquired by such a camera may include: an image including only a container planned to be applied to a plant but not the plant, an image including only a plant to be identified but not a container planned to be applied to the plant, and an image including both the plant to be identified and the container thereof. In the present disclosure, when acquiring the image, a user may include the plant and the container in the same image simultaneously. For example, the user may photograph the plant currently placed or planted in the container to understand whether the current container is suitable for the plant. If not suitable, then changing to other containers for the plant is considered; the user may also acquire an image of the plant and an image of the container separately. For example, the user may photograph an image of a plant of interest and then photograph an image of a container planned to accommodate or grow the plant to understand whether the container is suitable for the plant of interest, and if not suitable, then not using the container for the plant and looking for another container are considered.

Here, the shape of the container may refer to a geometric shape according to an outer contour of the container. As a non-limiting example, the shape of the container may include a cylinder, an inverted/upright truncated cone, a prism, an inverted/upright truncated prism, combinations of the shapes, and other regular or irregular geometric shapes. For a 2D image acquired by a camera, the views of containers of different shapes from some angles may be similar. For example, the front views and side views of cylindrical and prismatic containers may be similar. However, the actual sizes of the containers and the methods used to calculate the actual sizes (such as volume) thereof may be different. Therefore, in an embodiment of the present disclosure, the acquired image including the container may include at least two images acquired from at least two different directions, thereby facilitating identification of the shape of the container, and the actual size of the container is acquired more accurately. For example, in order to distinguish between cylindrical and prismatic containers, the front views and top views of the containers may be acquired to determine the shapes of the containers.

As a non-limiting example, the associated camera information may refer to internal parameters of the camera, such as the focal length of the lens, or the distance between the lenses (in the case where the lens of the camera is a lens group comprising multiple lenses). The camera parameters may be directly acquired from apparatus information. For example, when a user uses a mobile device such as a smartphone or a tablet to acquire an image through a mobile application, the mobile application may pop up a request to acquire the apparatus information, so that the camera information may be directly acquired from the mobile device.

In an embodiment of the present disclosure, after acquiring the image and/or when identifying a container based on the image, information associated with the container in the image may be acquired from the user by pushing interactive questions to the user through the mobile application. The interactive questions may include but are not limited to asking the user about, for example, the shape, material, and whether there is a drainage hole of the container. According to the information acquired from the user, identification and determination of the container may be assisted. This information may be information that the user may easily acquire through, for example, vision and touch. Responses from the user to the interactive questions may take the form of, for example, but not limited to, selecting from provided response options, or entering text responses.

As a non-limiting example, the actual size information of the container may refer to the actual height, opening diameter or opening width, bottom diameter or bottom width, volume, and a ratio among the height, the opening diameter or the opening width, and the bottom diameter or the bottom width of the container. For example, for a container formed in a cylindrical shape, the size information may include, for example, the bottom diameter, the height, the volume, and the ratio between the bottom diameter and the height; for a container formed in a truncated-cone shape, the size information may include the bottom diameter, the opening diameter, the height, the volume, and the ratio among the height, the opening diameter, and the bottom diameter; for a container formed in a rectangular shape, the size information may include the bottom length and width, the height, the volume, and the ratio among the bottom length, the width, and the height. Therefore, the actual size information of the container to be calculated may be determined according to the identified shape of the container. As a non-limiting example, for the container formed in the cylindrical shape, the actual size to be calculated may include, for example, one or more of the following: the bottom diameter, the height, the volume, the ratio between the bottom diameter and the height. For the container formed in the rectangular shape, the actual size to be calculated may include, for example, one or more of the following: the length, the width, the height, the volume, the ratio between the length and the width, the ratio between the length and the height, the ratio between the width and the height.

In the present disclosure, the actual size information of the container may be calculated by using a method of edge detection. Specifically, edges of the container in the image may be identified based on the image including the container; an actual distance between the camera used to acquire the image and the container is calculated based on the camera information and the image including the container; and the actual size of the container is calculated based on the edges identified in the image, the calculated actual distance, and the identified shape. In an embodiment of the present disclosure, edge detection may be implemented by adopting an edge detection algorithm known in the related art, such as an edge detection algorithm based on OpenCV, such as Sobel, Scarry, Canny, Laplacian, Prewitt, Marr-Hildresh, Scharr, or by adopting a neural network model trained to detect edges. Furthermore, in the case of the image including both the container and the plant as described above, when edge detection is performed, the edge of the container may be detected based on the original image, or the original image may be first divided into a container area and a non-container area (such as a plant area) through the neural network model (such as through target identification or semantic segmentation), and then edge information of the container may be further acquired in the container area.

Figure 2:
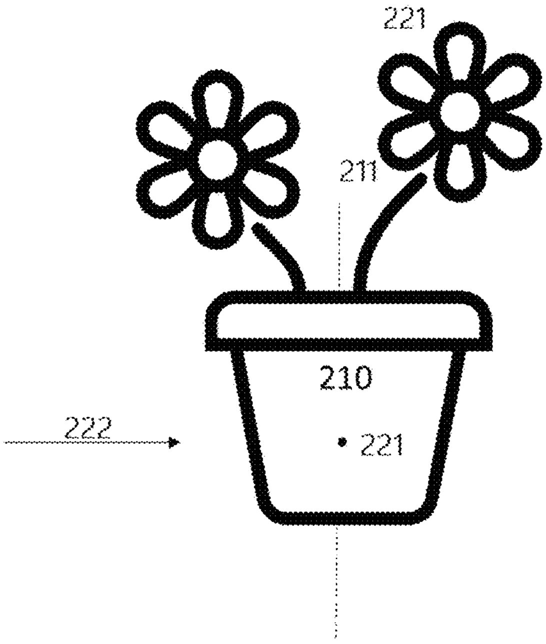
FIG. 2 is a schematic diagram schematically illustrating acquiring an image through a camera according to an embodiment of the present disclosure.

In an embodiment according to the present disclosure, the image used to calculate the actual size information of the container may be an image acquired from the front of the container, for example, one or more images acquired from an angle orthogonal to or parallel to an axis of the container. For example, referring to FIG. 2, FIG. 2 is a schematic diagram schematically illustrating acquiring an image through a camera according to an embodiment of the present disclosure. As shown in FIG. 2, for a flower pot 210 having a symmetry axis 211, a front view or a side view of the flower pot may be acquired from a direction 221 perpendicular to the symmetry axis 211 (the direction 221 is perpendicular to the paper surface) or a direction 222 perpendicular to the symmetry axis 211. Furthermore, according to the front view or the side view of the flower pot and in combination with the camera information, the actual length of each edge of the flower pot 210 may be calculated. For example, for a trapezoidal front view of the flower pot 210 formed in an inverted truncated cone shape as shown in FIG. 2, the actual length of each side of the trapezoid may be calculated. Furthermore, based on the calculated actual length of each side of the trapezoid, the following actual sizes of the flower pot 210 may be acquired: the bottom diameter, the opening diameter, the height, the volume, and the ratio among the height, the opening diameter, and the bottom diameter. It should be understood that the image used to calculate the actual size information of the container may not be acquired from the front of the container. For example, for the flower pot 210 shown in FIG. 2, the image may be acquired from an acute angle with respect to the symmetry axis 211. However, such an image may be distorted and need to be corrected, so the calculation process may be more complicated. In an embodiment according to the present disclosure, at least two images acquired from at least two different directions may be used to calculate the actual size information of the container.

In the present disclosure, the actual size information of the container may be calculated by using a method of vertex detection. Specifically, at least two images of the container from different viewing angles may be acquired by shooting; for each image, two-dimensional position information of multiple object vertices therein is acquired; based on the at least two images, a three-dimensional spatial coordinate system is established according to a feature point matching method to determine the spatial position of the camera; and any one of the images is selected, based on camera calibration parameter information and the spatial position of the camera, three-dimensional spatial position information of the multiple vertices, and then the actual size of the container is acquired. Specifically, establishing the three-dimensional spatial coordinate system according to the feature point matching method to determine the spatial position of the camera may include: extracting two-dimensional feature points matching each other in the at least two images; acquiring a constraint relationship between the at least two images according to the two-dimensional feature points matching each other; based on the constraint relationship, acquiring three-dimensional spatial positions of the two-dimensional feature points in each image, and then acquiring the spatial position of the camera corresponding to each image. Preferably, the spatial position of the camera may be determined based on three or more images from different viewing angles, and thus the actual size of the container is determined.

In the present disclosure, calculating the actual size information of the container may utilize the existing mobile application of the mobile device. As a non-limiting example, the actual size of the container may be measured using "measure" mobile application and the camera of a mobile device based on the iOS operating system (for example, reference may be made to https://support.Apple.com/zh-cn/guide/iphone/iphd8ac2cfea/ios for specific details). A mobile device running the Android operating system may also use a similar mobile application to measure the actual size information of the container.

Referring back to FIG. 1, in S12, the species of the plant may be identified based on the image including the plant. Specifically, identifying the species of the plant may include using a pre-trained identification model to identify the species of the plant. It should be understood that the method of identifying the species is not limited thereto. Here, the species of the plant may refer to the botanical classification of the plant, including, for example, phylum, class, order, family, genus, species, may refer to the name of the plant, including, for example, the common name, alias, vulgar name (informal name), scientific name, and may also be any reference distinguishing the plant from other plants.

In an embodiment of the present disclosure, the image input into the identification model may be an original image, for example, an image that has not been segmented, or an image that has not been labeled. In an embodiment of the present disclosure, the image input into the identification model may also be a processed image, for example, an image including a portion of a plant acquired by segmenting the original image, or an image labeled with information.

In an embodiment of the present disclosure, the identification model may be trained using plant image samples labeled with species names. In an embodiment of the present disclosure, in addition to the species name, the plant image samples for training the identification model may further be labeled with shooting location information of the plant image samples, shooting time information of the plant image samples, or shooting weather information of the plant image samples. This mainly takes into account that the morphology presented by plants may be different at different times (such as different times of the day, different seasons of the year), in different locations, and in different weather (such as different light conditions). Furthermore, the shooting weather information may also be acquired from an external source such as the Internet based on the shooting time information and the shooting time and location. Furthermore, in an embodiment of the present disclosure, before identifying the species of the plant using the identification model, impossible plant species may be excluded based on the location information and the time information of the plant to be identified, thereby the identification process is simplified. In an embodiment of the present disclosure, the image of the plant to be identified photographed by the current user may be stored in a sample library corresponding to the species of the plant, and the location information, physiological cycle, and morphological information of the plant may be recorded for subsequent use by the user. When storing the image, the shooting location information, the shooting time information, and the shooting weather information may also be recorded. Furthermore, images of plants other than the plant to be identified photographed by the user may also be stored and utilized.

In the present disclosure, as a non-limiting example, the identification model may be a convolutional neural network CNN, such as a residual neural network ResNet. The convolutional neural network model may be a deep feed-forward neural network. The convolutional neural network model may use the convolution kernel to scan the plant image, extract the features to be identified in the plant image, and then perform identification based on the features to be identified of the plant. In addition, in an embodiment according to the present disclosure, in the process of identifying the plant image, the original plant image may be directly input into the convolutional neural network model without pre-processing the plant image. Compared with other identification models, the convolutional neural network model has higher identification accuracy and efficiency. Compared with the convolutional neural network model, the residual network model has an additional identity mapping layer, which can avoid the phenomenon of accuracy saturation or even decrease caused by the convolutional neural network as the network depth (the quantity of stacked layers in the network) increases. The identity mapping function of the identity mapping layer in the residual network model needs to satisfy: the sum of the identity mapping function and the input of the residual network model is equal to the output of the residual network model. After the introduction of the identity mapping, the change of output caused by the residual network model is more notable, so the identification accuracy and identification efficiency of plant identification can be greatly improved.

In an embodiment of the present disclosure, the training process of the identification model may include:

S121: A large number of plant image samples of different species are acquired, in which the plant image samples are labeled with plant species, and the types of the species are predetermined. In an embodiment according to the present disclosure, the plant image samples may also be labeled with shooting location information of the plant image samples, shooting time information of the plant image samples, or shooting weather information of the plant image samples. In an embodiment according to the present disclosure, the quantity of the plant image samples of the respective species may be the same or different.

S122: The plant image samples are divided into a test set and a training set. The division process may be performed randomly or manually. For each species, the ratio of the quantity of plant image samples in the test set to the total quantity of plant image samples may be, for example, 5% to 20%, and the ratio may be adjusted as needed, as is the case with the training set.

S123: The neural network is trained using the training set.

S124: After training is performed using the training set in S123, the accuracy of the identification model is validated with the test set, and whether the accuracy is higher than a threshold is determined.

S125: If the accuracy is higher than the threshold, then the training ends.

S126: If the accuracy is not higher than the threshold, then the test set and the training set are divided again or new plant image samples are added, and the model is trained again. That is, Steps S123 to S126 are repeated until the accuracy is higher than the threshold.

Next, still referring to FIG. 1, in S13, whether the actual size information of the container is within a container size range suitable for the identified species may be determined based on the identified species, the identified shape of the container, and the calculated actual size information. Specifically, after the species is identified, the size range of the container corresponding to the identified species may be acquired from a species-container size information database. In an embodiment of the present disclosure, the species-container size information database may be, for example, a pre-established database, a data table, or a data file, in which a corresponding relationship between species and a reasonable size range of a container corresponding to the species is recorded. In an embodiment of the present disclosure, the corresponding relationship may also be acquired from an external source such as the Internet. In an embodiment according to the present disclosure, the size range in the database may be associated with the shape of the container. For example, for the same species, containers of different shapes may have different size ranges.

In an embodiment according to the present disclosure, the size range suitable for the identified species may include a maximum value and/or a minimum value of the size range, any actual size within a range of +10% (as a non-limiting example) of the maximum value and/or the minimum value may be determined that the actual size is within the size range suitable for the identified species. For example, if the size range acquired from the database is height ≥20 cm, then the expanded size range considering the error is ≥(1-10%)*20 cm. That is, if the actual height of the container is ≥18 cm, then it may be determined that the actual size information of the container is within the container size range suitable for the identified species. For example, if the size range acquired from the database is diameter≤10 cm, then the expanded size range considering the error is ≤(1+10%)*10 cm. That is, if the actual diameter of the container is ≤11 cm, then it may be determined that the actual size information of the container is within the container size range suitable for the identified species. For example, if the size range acquired from the database is 0.8<ratio between diameter and height <1.2, then the expanded size range considering the error is (1-10%)*0.8<ratio between diameter and height <(1+10%)*1.2. That is, if the actual ratio between diameter and height of the container is in a range of 0.72 to 1.32, then it may be determined that the actual size information of the container is within the size range suitable for the identified species. It should be understood that the above numerical ranges are merely examples and may be adjusted as needed.

In an embodiment according to the present disclosure, considering the error introduced in the actual size of the container due to, for example, identification or calculation, the actual size information of the container may be regarded as including a numerical range whose difference from the numerical value is within an error range of +10% of the numerical value. That is, the numerical range includes all values of (1-10%)*the actual size of the container and (1+10%)*the size of the container, and if the numerical range intersects with the size range suitable for the identified species, then it may be determined that the actual size information of the container is within the container size range suitable for the identified species. For example, if the calculated actual size information is height=20 cm and the size range acquired from the database is height ≤18 cm, then it may be regarded that the actual height of the container has a numerical range of 18 cm to 22 cm. Therefore, it is determined that the actual size information of the container is within the size range suitable for the identified species. It should be understood that the above numerical ranges are merely examples and may be adjusted as needed.

In an embodiment according to the present disclosure, the above two situations may be considered simultaneously. If the two ranges (that is, the expanded size range considering the error compared to the original container size range acquired from the external source, and the numerical range whose difference from the calculated actual size information of the container is within the error range) intersects, then it may be determined that the actual size information of the container is within the size range suitable for the identified species.

In the present disclosure, one or more of the quantity, growth stage information, and morphological information of the plants may further be identified based on the image including the plants; and whether the container is suitable for plant maintenance is determined based on the one or more of the quantity, the growth stage information, and the morphological information identified of the plants.

In the present disclosure, a material identification model may further be used to identify the material of the container, and whether the container is suitable for plant maintenance is determined according to the identified material. Similar to plant species identification, a neural network may be trained to acquire the material identification model for identifying the material of the container. As a non-limiting example, when the identified plant species is a plant prone to root rot, the corresponding reasonable container material may include a material with good water permeability and air permeability, such as pottery. If the material identification model identifies that the material of the container is plastic, then it may be determined that the container is not suitable for plant maintenance.

After determining whether the container is suitable for plant maintenance according to the method described above, the determined result may be output to remind the user.

Several non-limiting examples of embodiments according to the present disclosure are detailed below.

In a non-limiting example, specifically, in identifying a plant, it is necessary to identify the species of the plant, and in calculating the actual size information of the container, it is necessary to calculate the height, the opening diameter or width, the bottom diameter or width, and the ratio among the height, the opening diameter or width, and the bottom diameter or width of the container. The species here may be "classification" as shown in Table 1 below, or may be "plant examples". According to the method described above, after the plant species is identified, the corresponding container size range may be acquired from the species-container size information database, and whether the actual size identified of the current container is within the container size range acquired from the species-container size information database is determined.

The corresponding relationship between species and container sizes in the associated species-container size information database is specifically shown in the table as follows:

TABLE 1

| Classification | Plant Examples | Corresponding Container Size Range | Reason |
|---|---|---|---|
| Low-growing herbaceous plants | For example, petunia, herbaceous crabapple, fuchsia, various succulents, kalanchoe, chrysanthemum | Height ≤20 cm, opening diameter or width: height >1.2 (shallow pot) | The root system of this type of plant is easy to branch, with fewer taproots, abundant capillary roots, vigorous lateral development, and weak vertical development. Therefore, if the plant is planted in a shallow pot and watered frequently, then the roots are not easy to rot, easy to grow branches, is able to bloom more, and thus the ornamental value is high. If a deep pot is used for planting, then the water and air permeability is poor, and the capillary roots are very easy to rot or lack of oxygen, which may lead to poor growth or difficulty in blooming. |
| Non-low-growing herbaceous plants | For example, orchids, including clivia | Height >20 cm, opening diameter or width: height <0.8 (deep pot) | The root system of this type of plant is not easy to branch, with fewer capillary roots, vigorous vertical development, and weak lateral development. Therefore, if the flower pot is too shallow, then the tips of the roots reach the bottom of the flower pot and not be able to grow further, and thus growth and blooming are affected. In addition, in order to prevent the soil in the middle and lower portions of the pot from being too wet and causing root rot, the requirements for the water permeability and air permeability of the flower pot are relatively high. |
| Climbing herb | For example, pothos, clematis, fragrant vine | 0.8 < opening diameter or width: height <1.2, 0.8 < bottom diameter or width: height <1.2, height >25 cm (cube pot) | It is best to plant this type of plant in a flower pot with a similar aspect ratio, with the diameter and depth of the flower pot kept consistent. In addition, the flower pot planting this type of plant should be larger, because only when the root system grows lush enough, the plant can produce more vines and climb higher. |
| Shrubs | For example, shrub roses, jasmine, azalea | 0.8 < opening diameter or width: height <1.2, | The choice of flower pots for this type of plant is similar to the climbing herbs, with similar aspect ratios. |

TABLE 1-continued

| Classification | Plant Examples | Corresponding Container Size Range | Reason |
|---|---|---|---|
| | | 0.8 < bottom diameter or width: height <1.2, height >25 cm | The root systems thereof can develop both laterally and vertically, and both the height of the plant and the branching performance of the plant have to be considered. |
| Woody plants | For example, osmanthus, woody crabapple, white jasmine | Height >30 cm (deep pot) | It is best to plant this type of plant in a deep pot. The root systems of this type of plant are more likely to develop vertically, if planted in a shallow pot, then the plant no longer grows taller after the taproot grows to the bottom of the flower pot. On the other hand, if it is desired to artificially limit the height of the plant, then a shallow pot may be used for planting. |
| Plants that need to reduce root growth | For example, asparagus fern, kalanchoe chinensis | Height ≤10 cm, opening diameter or width: height >1 (shallow pot, small pot) | This type of plant, such as bonsai plants, may be planted in shallow or small pots to limit the growth of the root system, which can also limit the growth of the plant. On the one hand, it is for the sake of beauty, and on the other hand, it is also for better shaping. |
| Plants prone to root rot | For example, money tree, zamioculcas japonica, camellia | Height ≤20 cm, opening diameter or width: height >1.1 (shallow pot) | It is best to plant this type of plant in a shallow pot, which has good ventilation and air permeability and allows water to evaporate easily. On the other hand, for aesthetics, it may be considered to plant in a shallow pot and then cover with a tall pot so that it looks like the plant is planted in a deep pot; or it may be considered to plant in a deep pot, but the bottom of the pot is filled with large particles such as tiles and expanded clay, which can reduce the thickness of the soil layer to achieve the effect of shallow pot planting, and also improve ventilation, water permeability, and air permeability. |

It should be understood that the conditions shown in Table 1 are merely non-limiting examples, and the reasonable container size range corresponding to the plant may be specifically determined and adjusted according to the growth characteristics of the plant. For example, small plants use small pots, large plants use large pots, tall plants use deep pots, short plants use shallow pots, plants with vertically developing root systems use deep pots, plants with laterally developing root systems use shallow pots, and plants with root systems prone to rot use shallow pots. In addition, in a preferred option, a flower pot with a large pot opening is used, which can increase the area in contact with the air on one hand, which facilitates water evaporation and ventilation, which on the other hand, can facilitate repotting. For small flowers, large pots are avoided, and for plants with weak roots or with root systems sensitive to waterlogging, deep pots are used.

In another non-limiting example, specifically, in identifying a plant, it is necessary to identify the species, the growth stage information, and the quantity of the plant, and in calculating the actual size information of the container, it is necessary to calculate the height, the opening diameter, and the bottom diameter of the container. According to the method described above, after the species, the growth stage information, and the quantity of the plant are identified, the corresponding container size range of the species of the plant at the growth stage and in the quantity may be acquired from the species-container size information database, and whether the actual size identified of the container is within the container size range acquired from the species-container size information database is determined.

The corresponding relationship between the plants of the species and container sizes at different growth stages and in different quantities in the associated species-container size information database is specifically shown in Table 2, and Table 2 is directed to, for example, an exemplary case where herbaceous plants are planted in a flower pot formed in the inverted truncated cone shape.

TABLE 2

| Growth Stage | Quantity | Corresponding Container Size Range |
|---|---|---|
| young seedling with 1 leaf | 4 to 6 plants per pot | 10 cm ≤ opening diameter ≤ 13 cm, 11 cm ≤ height ≤ 13 cm, 8.5 cm ≤ bottom diameter ≤ 11 cm |

TABLE 2-continued

| Growth Stage | Quantity | Corresponding Container Size Range |
|---|---|---|
| young seedling with 2 to 3 leaves | 2 to 3 plants per pot | 10 cm ≤ opening diameter ≤ 13 cm, 11 cm ≤ height ≤ 13 cm, 8.5 cm ≤ bottom diameter ≤ 11 cm |
| juvenile seedling with 3 to 5 leaves | 1 plant per pot | 10 cm ≤ opening diameter ≤ 13 cm, 11 cm ≤ height ≤ 13 cm, 8.5 cm ≤ bottom diameter ≤ 11 cm |
| juvenile seedling with 5 to 8 leaves | 1 plant per pot | 13 cm ≤ opening diameter ≤ 16.5 cm, 13 cm ≤ height ≤ 15 cm, 11 cm ≤ bottom diameter ≤ 12 cm |
| juvenile seedling with 8 to 10 leaves | 1 plant per pot | 16.5 cm ≤ opening diameter ≤ 20 cm, 15 cm ≤ height ≤ 16 cm, 12 cm ≤ bottom diameter ≤ 13 cm |
| mature plant with 10 to 15 leaves | 1 plant per pot | 20 cm ≤ opening diameter ≤ 23 cm, 16 cm ≤ height ≤ 20 cm, 13 cm ≤ bottom diameter ≤ 15 cm |
| mature plant with 15 to 25 leaves | 1 plant per pot | 26 cm ≤ opening diameter ≤ 33 cm, 22 cm ≤ height ≤ 26 cm, 18 cm ≤ bottom diameter ≤ 20 cm |
| mature plant with 20 to 25 leaves | 1 plant per pot | 33 cm ≤ opening diameter ≤ 40 cm, 26 cm ≤ height ≤ 28 cm, 20 cm ≤ bottom diameter ≤ 22 cm |

When the growth stage of the plant is identified as a young seedling with 2 to 3 leaves and two plants are planted in the flower pot, the operation may be to determine whether the actual size of the flower pot meets the following conditions: 10 cm≤opening diameter≤13 cm, 11 cm≤height≤13 cm, and 8.5 cm≤bottom diameter≤11 cm. That is, whether the flower pot is a 3-inch or 4-inch flower pot. If the conditions are met, then it may be determined that the flower pot is suitable for the growth and maintenance of the plant; otherwise, it may be determined that the flower pot is not suitable, and the user is notified.

It should be understood that the conditions shown in Table 2 are merely non-limiting examples, and the reasonable container size ranges corresponding to plants at different growth stages and in different quantities may be specifically determined and adjusted as needed.

Figure 3:
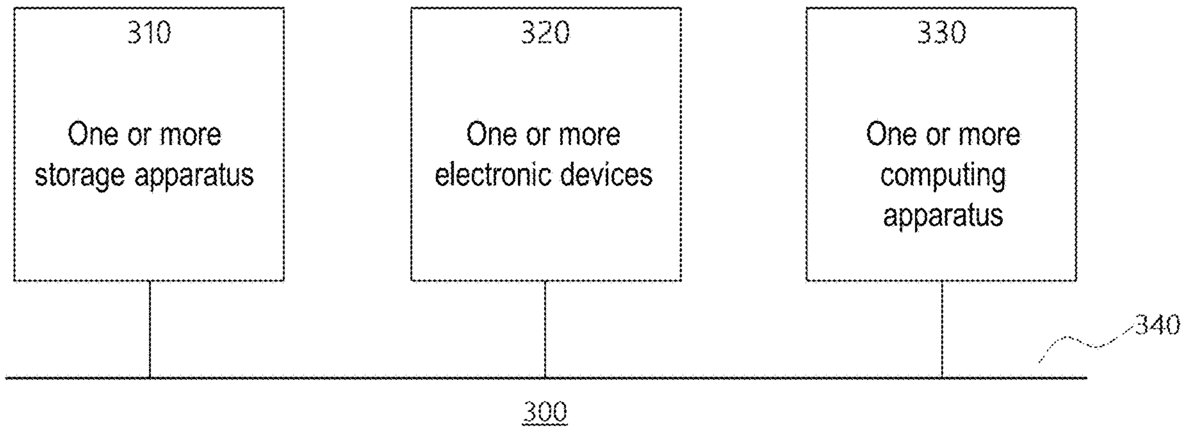
FIG. 3 is a structural diagram schematically showing at least a portion of a computer system for determining whether a container of a plant is suitable for plant maintenance according to an embodiment of the present disclosure.

FIG. 3 is a structural diagram schematically showing at least a portion of a computer system 300 for determining whether a container of a plant is suitable for plant maintenance according to an embodiment of the present disclosure. Persons skilled in the art should understand that the system 300 is merely an example and should not be considered to limit the scope of the present disclosure or the features described herein. In this example, the system 300 may include one or more storage apparatus 310, one or more electronic devices 320, and one or more computing apparatus 330, which may be communicatively coupled to each other via a network or bus 340. The one or more storage apparatus 310 provide storage services for the one or more electronic devices 320 and the one or more computing apparatus 330. Although the one or more storage apparatus 310 are shown in the system 300 as a separate block from the one or more electronic devices 320 and the one or more computing apparatus 330, it should be understood that the one or more storage apparatus 310 may actually be stored on any of the other entities 320, 330 included in the system 300. Each of the one or more electronic devices 320 and the one or more computing apparatus 330 may be located at a different node of the network or bus 340 and may be able to communicate directly or indirectly with other nodes of the network or bus 340. Persons skilled in the art should understand that the system 300 may further include other apparatus not shown in FIG. 3, in which each different apparatus is located at a different node of the network or bus 340.

The one or more storage apparatus 310 may be configured to store any of the data described above, including but not limited to, for example, images, models, data files, and application program files. The one or more computing apparatus 330 may be configured to execute the method 100 and/or one or more steps in the method 100. The one or more electronic devices 320 may be configured to execute one or more steps of the method 100 and other methods described herein.

The network or bus 340 may be any wired or wireless network and may also include cables. The network or bus 340 may be part of the Internet, the World Wide Web, a particular intranet, a wide area network, or a local area network. The network or bus 340 may utilize standard communication protocols such as Ethernet, WiFi, and HTTP, protocols proprietary to one or more companies, and various combinations of the above. The network or bus 340 may also include, but not limited to, an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

Figure 4:
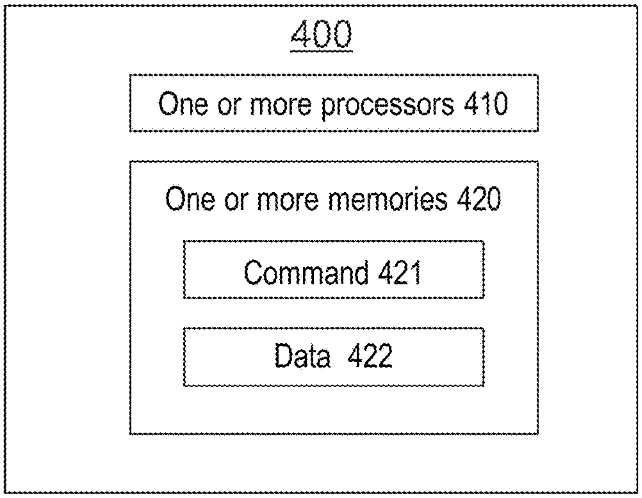
FIG. 4 is a structural diagram schematically illustrating at least a portion of a computer system for determining whether a container of a plant is suitable for plant maintenance according to an embodiment of the present disclosure.

Each of the one or more electronic devices 320 and the one or more computing apparatus 330 may be configured similarly to a system 400 shown in FIG. 4, that is, having one or more processors 410, one or more memories 420, commands, and data. Each of the one or more electronic devices 320 and the one or more computing apparatus 330 may be a personal computing apparatus used by a user or a commercial computer apparatus used by a business and have all components typically used together with the personal computing apparatus or the commercial computer apparatus, such as a central processing unit (CPU), a memory (for example, RAM and internal hard drive) storing data and commands, such as one or more I/O devices, for example, a display (for example, a monitor with a screen, a touch screen, a projector, a television, or other apparatus operable to display information), a cursor, a keyboard, a touch screen, a microphone, a speaker, and/or a network interface apparatus.

The one or more electronic devices 320 may further include one or more cameras for acquiring images, and all components for connecting the elements to each other. While the one or more electronic devices 320 may each comprise a full-sized personal computing apparatus, the apparatus may optionally include a mobile computing apparatus capable of wirelessly exchanging data with a server over a network such as the Internet. For example, the one or more electronic devices 320 may be a mobile phone, or an apparatus such as a PDA with wireless support, a tablet PC, or a netbook capable of acquiring information via the Internet. In another example, the one or more electronic devices 320 may be a wearable computing system.

FIG. 4 is a structural diagram schematically illustrating at least a portion of the computer system 400 for determining whether a container of a plant is suitable for plant maintenance according to an embodiment of the present disclosure. The system 400 includes the one or more processors 410, the one or more memories 420, and other components (not shown) typically present in an apparatus such as a computer. Each of the one or more memories 420 may store content accessible by the one or more processors 410, including commands 421 that may be executed by the one or more processors 410, and data 422 that may be retrieved, manipulated, or stored by the one or more processors 410.

The command 421 may be any set of commands to be executed directly by the one or more processors 410, such as machine codes, or any set of commands to be executed indirectly, such as a script. The terms "command," "application," "process," "step," and "program" may be used interchangeably herein. The command 421 may be stored in a target code format to be directly processed by the one or more processors 410, or stored in any other computer languages, including a script or collection of independent source code modules interpreted on demand or compiled ahead of time. The command 421 may include commands that cause, for example, the one or more processors 410 to function as the various models herein. The other parts of this document explain the functions, methods, and routines of the command 421 in more detail.

The one or more memories 420 may be any temporary or non-temporary computer-readable storage medium capable of storing content accessible by the one or more processors 410, such as hard disk drives, memory cards, ROM, RAM, DVDs, CDs, USB memories, writable memories, and read-only memories. One or more of the one or more memories 420 may include a distributed storage system, in which the commands 421 and/or the data 422 may be stored on multiple different storage apparatus that may be physically located at the same or different geographic locations. One or more of the one or more memories 420 may be connected to the one or more processors 410 via the network, and/or may be directly connected to or incorporated into any of the one or more processors 410.

The one or more processors 410 may retrieve, store, or modify the data 422 according to the commands 421. The data 422 stored in the one or more memories 420 may include at least a portion of one or more of the respective items stored in the one or more storage apparatus 310 described above. For example, although the subject matter described herein is not limited to any particular data structure, the data 422 may further be stored in a computer register (not shown), or may be stored in a relational database as a table with many different fields and records or as an XML document. The data 422 may be formatted in any computing apparatus readable format such as, but not limited to, binary values, ASCII, or Unicode. Additionally, the data 422 may include any information sufficient to identify related information, such as a given number, descriptive text, designated code, pointer, reference to data stored in other storage such as at another network location, or information used by a function to calculate the related data.

The one or more processors 410 may be any conventional processor, such as a commercially available central processing unit (CPU), or a graphics processing unit (GPU). Alternatively, the one or more processors 410 may also be a dedicated component, such as an application specific integrated circuit (ASIC) or other hardware based processor. Although not required, the one or more processors 410 may include specialized hardware components to perform specific computing processes more quickly or more efficiently, such as image processing of images.

Although FIG. 4 schematically shows the one or more processors 410 and the one or more memories 420 in the same block, the system 400 may actually include multiple processors or memories that may exist in the same physical housing or in different physical housings. For example, one of the one or more memories 420 may be a hard drive or other storage medium located in a housing different from the housing of each of the one or more computing apparatus (not shown) described above. Therefore, reference to a processor, computer, computing apparatus, or memory should be understood to include reference to a collection of processors, computers, computing apparatus, or memories that may operate in parallel or may not operate in parallel.

The term "A or B" in the specification and claims includes "A and B" and "A or B" rather than exclusively including only "A" or only "B" unless specifically stated otherwise.

In the present disclosure, reference to "an embodiment" or "some embodiments" means that a feature, structure, or characteristic described in connection with the embodiment is included in at least one embodiment or at least some embodiments of the present disclosure. Therefore, the appearances of the phrases "in an embodiment" or "in some embodiments" in various places throughout this disclosure are not necessarily referring to the same embodiment or the same embodiments. Furthermore, the features, structures, or characteristics may be combined in any suitable combinations and/or sub-combinations in one or more embodiments.

As used herein, the word "exemplary" means "serving as an example, instance, or illustration" rather than as a "model" to be exactly copied. Any implementation described herein as exemplary is not necessarily to be construed as preferred or advantageous over other implementations. Furthermore, the present disclosure is not intended to be bound by any expressed or implied theory presented in the preceding technical field, background, brief summary, or detailed description.

Additionally, certain terminology may also be used in the following description for the purpose of reference only, and thus is not intended to be limiting. For example, the words "first," "second," and other such numerical words referring to structures or elements do not imply a sequence or order unless clearly indicated by the context. It should also be understood that when the term "include/comprise" is used in this document, the term indicates the presence of the specified features, entities, steps, operations, units, and/or components, but does not exclude the presence or addition of one or more other features, entities, steps, operations, units, and/or components and/or combinations thereof.

In this disclosure, the terms "component" and "system" are intended to refer to a computer-related entity, either hardware, a combination of hardware and software, software, or software in execution. For example, a component may be, but is not limited to, a process, an object, an executable, a thread of execution, and/or a program running on a processor. By way of illustration, both an application running on a server and the server may be a component. One or more components may exist in a process and/or thread of execution, and a component may be localized on one computer and/or distributed between two or more computers.

Persons skilled in the art should understand that the boundaries between the above operations are merely illustrative. Multiple operations may be combined into a single operation, a single operation may be distributed among additional operations, and operations may be performed at least partially overlapping in time. Moreover, alternative embodiments may include multiple instances of a particular operation, and the order of operations may be altered in various other embodiments. However, other modifications, variations, and alternatives are also possible. The specification and drawings are, accordingly, to be regarded in an illustrative rather than a restrictive sense.

Although some specific embodiments of the present disclosure have been described in detail through examples, persons skilled in the art should understand that the above examples are only for illustration rather than for limiting the scope of the present disclosure. The various embodiments disclosed herein may be combined in any manner without departing from the spirit and scope of the present disclosure. It should also be understood by persons skilled in the art that various modifications may be made to the embodiments without departing from the scope and spirit of the present disclosure. The scope of the present disclosure is defined by the appended claims.

What is claimed is:

1. A method for determining whether a container of a plant is suitable for plant maintenance, comprising:

- identifying a shape of the container and calculating actual size information of the container based on an image comprising the container acquired by a camera and associated camera information, wherein the actual size information comprises one or more of actual sizes as follows of the container: a height, an opening diameter or an opening width, a bottom diameter or a bottom width, a volume, and a ratio among the height, the opening diameter or the opening width, and the bottom diameter or the bottom width;
- identifying a species of the plant based on an image comprising the plant;
- determining whether the actual size information of the container is within a container size range suitable for the species identified based on the species identified, the shape, which is identified, of the container, and the actual size information calculated of the container, so as to determine whether the container is suitable for plant maintenance;
- wherein calculating the actual sizes of the container comprises:
  - identifying the edges of the container in the image based on the image comprising the container;
  - calculating an actual distance between the camera acquiring the image and the container based on the camera information and the image comprising the container; and
  - calculating the actual sizes of the container based on the edges identified in the image, the actual distance calculated, and the shape, which is identified;
- wherein a container size range of the species is associated with the shape of the container.

2. The method according to claim 1, wherein identifying the species of the plant comprises:

- using an identification model, which is pre-trained, to identify the species of the plant, wherein the identification model is trained using a plurality of plant image samples, which are labeled with species names.

3. The method according to claim 2, wherein an image input into the identification model is an original image or an image comprising a portion of the plant acquired by segmenting the original image.

4. The method according to claim 2, wherein training of the identification model comprises:

- acquiring the plurality of plant image samples of different species, wherein the plant image samples are labeled with the species name,
- dividing the plurality of plant image samples into a test set and a training set, and
- using the training set to train a neural network, and using the test set to validate accuracy of the identification model; and
- determining whether the accuracy is higher than a threshold:
- if the accuracy is higher than the threshold, then the training ends,
- otherwise, dividing again the test set and the training set or adding new plant image samples, and training the model again.

5. The method according to claim 4, wherein the plant image samples for training the identification model are further labeled with one or more pieces of information as follows:

- shooting location information of the plant image samples,
- shooting time information of the plant image samples,
- shooting weather information of the plant image samples.

6. The method according to claim 4, wherein the neural network is one of a convolutional neural network and a residual neural network.

7. The method according to claim 1, wherein the method further comprises:

- identifying one or more of quantities, growth stage information, and morphological information of the plants based on the image comprising the plants; and
- determining whether the container is suitable for plant maintenance based on the one or more of the quantities, the growth stage information, and the morphological information, which are identified, of the plants.

8. The method according to claim 1, wherein the image comprising the container is one or more images acquired from an angle orthogonal or parallel to an axis of the container.

9. The method according to claim 1, wherein the method further comprises: using a material identification model to identify a material of the container, and determining whether the container is suitable for plant maintenance according to the material identified.

10. The method according to claim 1, wherein determining whether the actual size information of the container is within the container size range suitable for the species identified comprises:

- determining whether a numerical range whose difference from the actual size information calculated of the container being within an error range intersects with a container size range of the species identified;
- if there is an intersection, determining that the actual size information of the container is within the container size range suitable for the species identified.

11. The method according to claim 1, wherein the container size range is a size range expanded compared to a container size range acquired from an external source.

12. The method according to claim 1, further comprising acquiring information associated with the container from a user.

13. The method according to claim 1, wherein both the image comprising the plant and the image comprising the container are at least portions of same image shot by the camera.

14. The method according to claim 1, wherein the image comprising the plant and the image comprising the container are different images.

15. An apparatus for determining whether a container of a plant is suitable for plant maintenance, wherein the apparatus comprises:

one or more processors; and a memory storing computer readable commands, wherein when the computer readable commands are executed by the one or more processors, the one or more processors are caused to execute the method according to claim 1.

16. A non-transitory computer-readable storage medium, wherein the non-transitory computer-readable storage medium stores computer-readable commands, wherein when the computer readable commands are executed by one or more computing apparatus, the one or more computing apparatus are caused to execute the method according to claim 1.

17. The method according to claim 10, wherein the container size range is a size range expanded compared to a container size range acquired from an external source.

* * * * *